(12) United States Patent
Miller

(10) Patent No.: US 9,517,524 B2
(45) Date of Patent: Dec. 13, 2016

(54) WELDING WIRE SPOOL SUPPORT

(71) Applicant: LINCOLN GLOBAL, INC., City of Industry, CA (US)

(72) Inventor: Victor Miller, Jamul, CA (US)

(73) Assignee: Lincoln Global, Inc., City of Industry, CA (US)

( * ) Notice: Subject to any disclaimer, the term of this patent is extended or adjusted under 35 U.S.C. 154(b) by 223 days.

(21) Appl. No.: 14/174,959

(22) Filed: Feb. 7, 2014

(65) Prior Publication Data

US 2015/0129700 A1 May 14, 2015

Related U.S. Application Data

(60) Provisional application No. 61/903,250, filed on Nov. 12, 2013.

(51) Int. Cl.
| | | |
|---|---|---|
| *B65H 16/04* | (2006.01) | |
| *B23K 9/32* | (2006.01) | |
| *B23K 9/133* | (2006.01) | |
| *B23K 9/173* | (2006.01) | |
| *B65H 49/20* | (2006.01) | |
| *B65H 51/10* | (2006.01) | |

(52) U.S. Cl.
CPC ............ *B23K 9/32* (2013.01); *B23K 9/1333* (2013.01); *B23K 9/173* (2013.01); *B65H 49/205* (2013.01); *B65H 51/10* (2013.01); *B65H 2402/412* (2013.01)

(58) Field of Classification Search
CPC ......... B65H 75/02; B65H 49/00; B65H 77/00; B65H 51/10; B65H 49/205; B65H 2402/412; B23K 9/12; B23K 9/32; B23K 9/133; B23K 9/1333

USPC .............................................. 242/597, 597.8
See application file for complete search history.

(56) References Cited

U.S. PATENT DOCUMENTS

| | | | |
|---|---|---|---|
| 1,114,793 | A | 10/1914 | Murray |
| 1,704,846 | A | 3/1929 | Stresau |
| 2,138,837 | A | 12/1938 | Cadman |
| 2,515,302 | A | 7/1950 | Hughey |
| 2,547,872 | A | 4/1951 | Kissick |
| 2,710,328 | A | 6/1955 | Semple |
| 2,795,689 | A | 6/1957 | McNutt |

(Continued)

FOREIGN PATENT DOCUMENTS

| | | |
|---|---|---|
| CA | 2422134 | 9/2004 |
| CN | 2675323 | 2/2005 |

(Continued)

OTHER PUBLICATIONS

Polysoude the Art of Welding, Tig—With or without Filler Wire, AVC, OSC, Open Welding Head for Welding of Tube to Tube Joints, Tube to Elbow Joints . . . , Polysoude S.A.S. France (Mar. 2011).

(Continued)

*Primary Examiner* — William A Rivera
(74) *Attorney, Agent, or Firm* — Foley & Lardner LLP

(57) ABSTRACT

The welding wire spool support wherein the housing is formed from a single sheet of material, the housing being attached to a base, wherein the base includes a spindle support extending upward therefrom, wherein the spindle is mounted on the spindle support; and wherein a wire feeder assembly is supported on the base and adapted to draw wire from the spool.

19 Claims, 9 Drawing Sheets

(56) References Cited

U.S. PATENT DOCUMENTS

| | | | |
|---|---|---|---|
| 2,806,125 A | 9/1957 | Miller | |
| 2,845,524 A | 7/1958 | Morley, Jr. | |
| 3,048,691 A | 8/1962 | Longstreth | |
| 3,137,782 A | 6/1964 | Rieppel et al. | |
| 3,179,781 A | 4/1965 | Ross | |
| 3,207,881 A | 9/1965 | Pagan | |
| 3,235,705 A | 2/1966 | Agnew et al. | |
| 3,239,648 A | 3/1966 | Syrigos | |
| 3,323,752 A | 6/1967 | Kurtz et al. | |
| 3,427,428 A | 2/1969 | Nelson et al. | |
| 3,542,996 A | 11/1970 | Bollinger | |
| 3,567,900 A | 3/1971 | Nelson et al. | |
| 3,576,966 A | 5/1971 | Sullivan | |
| 3,602,687 A | 8/1971 | Pollock | |
| 3,604,039 A * | 9/1971 | Aldridge | B23K 9/1336 |
| | | | 15/102 |
| 3,718,798 A | 2/1973 | Randolph et al. | |
| 3,737,614 A | 6/1973 | Paulange | |
| 3,806,691 A | 4/1974 | Roach | |
| 3,806,694 A | 4/1974 | Nelson et al. | |
| 3,815,807 A | 6/1974 | Bartley | |
| 3,826,888 A | 7/1974 | Garfield et al. | |
| 3,835,286 A | 9/1974 | Kazlauskas | |
| 3,839,619 A | 10/1974 | Normando et al. | |
| 3,852,943 A | 12/1974 | Healy | |
| 3,873,798 A | 3/1975 | Friedman et al. | |
| 3,891,156 A * | 6/1975 | Hunter | B65H 63/04 |
| | | | 242/129.8 |
| 4,091,258 A | 5/1978 | Kano et al. | |
| 4,132,338 A | 1/1979 | Bove et al. | |
| 4,153,142 A | 5/1979 | Spisz | |
| 4,161,640 A | 7/1979 | Bromwich et al. | |
| 4,168,406 A | 9/1979 | Torrani | |
| 4,196,333 A | 4/1980 | Emmerson | |
| 4,216,365 A | 8/1980 | Peyrot | |
| 4,255,641 A | 3/1981 | Connell et al. | |
| 4,282,771 A | 8/1981 | Grube | |
| 4,298,783 A | 11/1981 | Schneider et al. | |
| 4,300,034 A | 11/1981 | Schneider et al. | |
| 4,327,898 A | 5/1982 | Grant et al. | |
| 4,331,278 A | 5/1982 | Sherer et al. | |
| 4,343,983 A | 8/1982 | Schneider et al. | |
| 4,346,279 A | 8/1982 | Lessmann et al. | |
| 4,347,421 A | 8/1982 | Mukuda et al. | |
| 4,380,695 A | 4/1983 | Nelson | |
| 4,386,726 A | 6/1983 | Taff | |
| 4,455,471 A | 6/1984 | Ecer et al. | |
| 4,495,401 A | 1/1985 | Sidorov et al. | |
| 4,515,533 A | 5/1985 | Gomez | |
| 4,562,334 A | 12/1985 | Brandt | |
| 4,591,685 A | 5/1986 | Hinger et al. | |
| 4,672,163 A | 6/1987 | Matsui et al. | |
| 4,687,899 A | 8/1987 | Acheson | |
| 4,728,974 A | 3/1988 | Nio et al. | |
| 4,761,596 A | 8/1988 | Nio et al. | |
| 4,841,118 A | 6/1989 | Overbay | |
| 4,856,165 A | 8/1989 | Reuchlein et al. | |
| 4,891,493 A | 1/1990 | Sato et al. | |
| 4,891,494 A | 1/1990 | Baujat | |
| 4,896,812 A | 1/1990 | Kazlauskas | |
| 4,986,002 A | 1/1991 | Oros et al. | |
| 5,099,098 A | 3/1992 | Burgoon | |
| 5,155,330 A | 10/1992 | Fratiello et al. | |
| 5,220,144 A | 6/1993 | Jusionis | |
| 5,227,601 A | 7/1993 | Black | |
| 5,318,234 A * | 6/1994 | Biggs | B65H 51/205 |
| | | | 242/420.6 |
| 5,642,898 A | 7/1997 | Wise | |
| 5,692,700 A | 12/1997 | Bobeczko | |
| 5,710,403 A | 1/1998 | Jusionis | |
| 5,981,897 A | 11/1999 | Offer et al. | |
| 6,029,940 A | 2/2000 | Klein | |
| 6,091,048 A | 7/2000 | Lanouette et al. | |
| 6,201,207 B1 | 3/2001 | Maruyama et al. | |
| 6,271,495 B1 | 8/2001 | Rooney | |
| 6,380,505 B1 | 4/2002 | Stoops et al. | |
| 6,429,405 B2 | 8/2002 | Belloni et al. | |
| 6,479,795 B1 | 11/2002 | Albrecht et al. | |
| 6,512,195 B2 | 1/2003 | Domschot | |
| 6,609,679 B1 | 8/2003 | Seidel | |
| 6,617,548 B1 | 9/2003 | Bosio | |
| 6,657,161 B2 | 12/2003 | Marhofer et al. | |
| 6,696,012 B1 | 2/2004 | Theriot | |
| 6,953,909 B2 | 10/2005 | Marhofer et al. | |
| 7,034,250 B2 * | 4/2006 | Kensrue | B23K 9/1333 |
| | | | 219/137.7 |
| 7,114,732 B1 | 10/2006 | Ismail | |
| 7,176,411 B2 * | 2/2007 | Enyedy | B23K 9/1336 |
| | | | 219/137.2 |
| 7,205,500 B2 | 4/2007 | Watanabe et al. | |
| 7,208,699 B2 | 4/2007 | Stanzel | |
| 7,252,297 B1 * | 8/2007 | Barritt | B23K 7/10 |
| | | | 280/47.26 |
| 7,309,845 B2 | 12/2007 | Domschot | |
| 7,411,147 B2 | 8/2008 | Stanzel et al. | |
| 7,414,220 B2 | 8/2008 | Oyster et al. | |
| 7,423,238 B2 | 9/2008 | Stanzel et al. | |
| 7,455,472 B2 | 11/2008 | Lehner et al. | |
| 7,566,038 B2 | 7/2009 | Scott et al. | |
| 7,755,000 B2 | 7/2010 | Stanzel | |
| 7,952,045 B2 | 5/2011 | Tsurui et al. | |
| 8,096,921 B2 | 1/2012 | Hahn | |
| 8,143,549 B2 | 3/2012 | King, III et al. | |
| 8,167,322 B2 | 5/2012 | Greene | |
| 8,256,689 B2 | 9/2012 | Enyedy et al. | |
| 8,278,601 B2 | 10/2012 | Stanzel | |
| 8,338,752 B2 | 12/2012 | Enyedy et al. | |
| 8,357,876 B1 | 1/2013 | Allford et al. | |
| 8,393,059 B2 | 3/2013 | Dunn | |
| 2001/0015349 A1 | 8/2001 | Belloni et al. | |
| 2001/0047988 A1 | 12/2001 | Hiraoka et al. | |
| 2002/0153363 A1 | 10/2002 | Hiraoka et al. | |
| 2002/0166917 A1 * | 11/2002 | Eagelman | B65H 49/32 |
| | | | 242/421.7 |
| 2004/0065644 A1 | 4/2004 | Hiraoka et al. | |
| 2004/0094514 A1 | 5/2004 | Nista et al. | |
| 2005/0098551 A1 | 5/2005 | Hiraoka et al. | |
| 2005/0269313 A1 | 12/2005 | Vinegar et al. | |
| 2006/0076320 A1 | 4/2006 | Watanabe et al. | |
| 2006/0207981 A1 * | 9/2006 | Diekmann | B23K 9/1336 |
| | | | 219/137.2 |
| 2007/0012671 A1 | 1/2007 | Hiraoka et al. | |
| 2007/0119829 A1 | 5/2007 | Vietz et al. | |
| 2007/0297556 A1 | 12/2007 | Spencer et al. | |
| 2008/0197116 A1 | 8/2008 | Achtner et al. | |
| 2008/0230526 A1 | 9/2008 | Hiraoka et al. | |
| 2009/0039059 A1 | 2/2009 | Twarog et al. | |
| 2009/0242352 A1 | 10/2009 | Altonji et al. | |
| 2010/0133239 A1 | 6/2010 | Gunzelmann | |
| 2010/0183360 A1 | 7/2010 | Nguyen et al. | |
| 2010/0193571 A1 | 8/2010 | Gunzelmann | |
| 2011/0042365 A1 | 2/2011 | Hiraoka et al. | |
| 2011/0072874 A1 | 3/2011 | Basler et al. | |
| 2011/0114613 A1 | 5/2011 | Ihde | |
| 2011/0114616 A1 | 5/2011 | Albrecht | |
| 2011/0132877 A1 | 6/2011 | Miller et al. | |
| 2012/0118864 A1 | 5/2012 | L'Arvor et al. | |
| 2013/0126494 A1 | 5/2013 | Miller et al. | |
| 2013/0199323 A1 | 8/2013 | Fong et al. | |

FOREIGN PATENT DOCUMENTS

| | | |
|---|---|---|
| CN | 102974960 | 3/2013 |
| DE | 965794 C | 6/1952 |
| DE | 965794 | 6/1957 |
| DE | 3238496 | 10/1982 |
| EP | 0025989 | 9/1980 |
| EP | 1779963 | 2/2007 |
| EP | 2020272 | 2/2009 |
| EP | 2106872 | 10/2009 |
| EP | 2216120 | 8/2010 |
| EP | 2216121 | 8/2010 |
| EP | 2216122 | 8/2010 |

(56) References Cited

FOREIGN PATENT DOCUMENTS

| | | |
|---|---|---|
| EP | 2216123 | 8/2010 |
| EP | 2495817 | 9/2012 |
| GB | 848941 | 9/1960 |
| GB | 1142854 | 2/1969 |
| GB | 1272568 | 5/1972 |
| JP | 55100877 | 8/1980 |
| JP | 6199581 | 5/1986 |
| JP | H02255272 | 10/1990 |
| JP | H07111759 | 10/1993 |
| JP | H0641972 | 6/1994 |
| JP | H09285867 | 11/1997 |
| JP | H11197841 | 7/1999 |
| KR | 201000129435 | 12/2010 |
| KR | 20120025801 | 3/2012 |
| NL | 7401239 | 1/1974 |
| SU | 322247 | 9/1970 |
| WO | 95/23060 | 8/1995 |
| WO | 03/044375 A1 | 5/2003 |
| WO | 2008025553 A2 | 8/2007 |
| WO | 2010/089184 | 8/2010 |
| WO | 2012020249 A2 | 2/2012 |
| WO | 2012/097626 | 7/2012 |

OTHER PUBLICATIONS

Using compact, full-function weld heads; 2013 Limited Clearance/ Arc Machines, Inc., 10500 Orbital Way, Pacoima, CA 91331; Mar. 14, 2013.
Accra Wire Website, section on Weld Wire Dereelers, http://www.accuainc.com/weldwire.html, 3 pages, retrieved Nov. 13, 2014.

\* cited by examiner

US 9,517,524 B2

WELDING WIRE SPOOL SUPPORT

This application claims priority to and the benefit of U.S. Provisional Patent Application 61/903,250, filed on Nov. 12, 2013.

TECHNICAL FIELD

The present invention generally relates to a welding wire spool support. More particularly, the present invention relates to a welding wire spool support having a housing that is open on one side and includes an overhang that at least partially covers the top of the welding wire spool.

SUMMARY OF THE INVENTION

Figure 1:
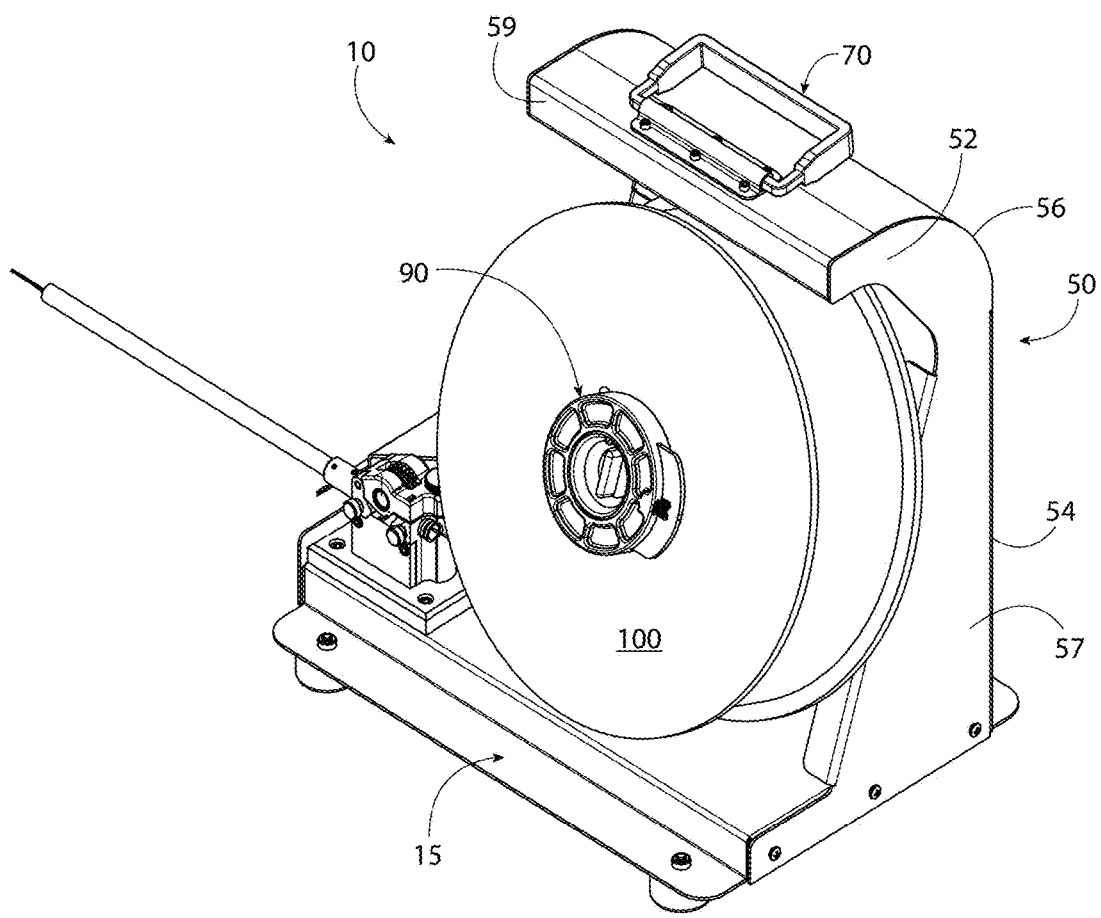
FIG. 1 is top perspective view of a welding wire spool support according to the invention.

In general, the present invention provides a welding wire spool support including a base, a stand extending upward from the base, the stand including a spindle adapted to rotatably support a spool thereon, and a housing, the housing including an overhang supported above the spool and extending at least partially over the spool when mounted on the spindle.

The present invention further provides the welding wire spool support wherein the housing is formed from a single sheet of material, the housing being attached to a base, wherein the base includes a spindle support extending upward therefrom, wherein the spindle is mounted on the spindle support; and wherein a wire feeder assembly is supported on the base and adapted to draw wire from the spool.

The present invention also provides a welding wire spool support comprising a housing, the housing being formed from a single sheet of material including a sidewall extending upward from the base, a front wall and a rear wall extending inward from the sidewall and defining an outward facing spool receiving opening; the housing further including an overhang portion extending outward from an upper end of the sidewall, the sidewall, front wall, rear wall, and overhang portion define a recess adapted to receive the wire spool therein; a spindle supported within the recess above the base and extending outward toward the spool receiving opening to receive the wire spool thereon; wherein the overhang portion extends outward from the sidewall above the spindle to at least partially cover the wire spool when the wire spool is supported on the spindle.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF THE INVENTION

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth. Likewise, the embodiments herein need not include the described and/or illustrated geometries. For example, various polygonal shapes can be employed. Straight-line geometries can be employed in place of rounded portions and vice versa. Thus, while one or more particular embodiments have been described in detail, these details are not to be interpreted as exhaustive or exclusive.

A welding wire spool support according to the invention is generally indicated by the numeral 10 in the accompanying drawings. A welding wire spool support 10 generally includes a base 15, a spool stand 30, and a housing 50.

The base 15 may be any member capable of supporting the spool stand 30 and may have any configuration including but not limited to the generally rectangular configuration shown. Base 15 supports the spool stand 30 and mounts to or rests on a supporting surface. Base 15 may include a platform 17 to which the spool stand 30 is attached. In the example shown, the platform 17 is located centrally between two downwardly offset flanges 21 formed at the margins of the base 15. The base may include a sidewall 19 formed by the downward offset to facilitate attachment of the housing 50 to the base 15. Plural feet 20 may be attached to the base 15 to provide further stability. Feet 20 may be of any shape or design and of any number suitable for supporting the base 15. In the example shown, the feet include four 4 disk-shaped members that are located near the corners of the base 15 and attached to underside 23 of flanges 21. It will be appreciated that feet 20 may be constructed of any suitable materials including metals, plastics, pulp materials, wood, ceramics, and combinations thereof. In the examples shown, feet 20 are constructed of rubber to further increase the stability of the base 15 by providing a higher grip surface to contact the supporting surface.

Spool stand 30 is supported on the base 15 and includes an upstanding member, which will be referred to as a post 32, that extends upward from the base 15 and supports a spindle 35 a distance above the base 15. Alternatively, spindle 35 may be supported on housing 50. For example, spindle 35 may be attached to and extend outward from a sidewall of housing 50.

Figure 8:
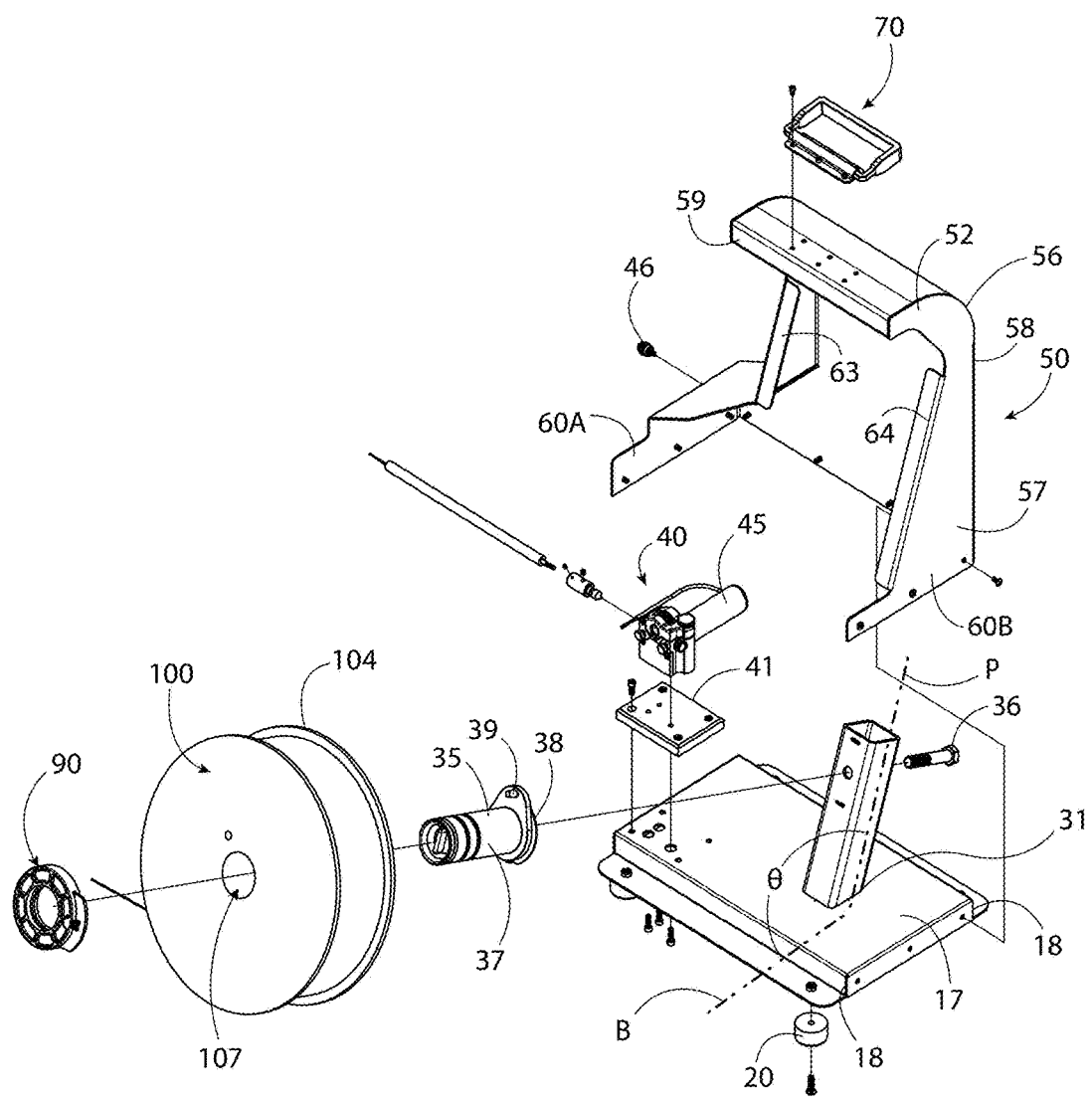
FIG. 8 is an exploded perspective view thereof.
Figure 10:
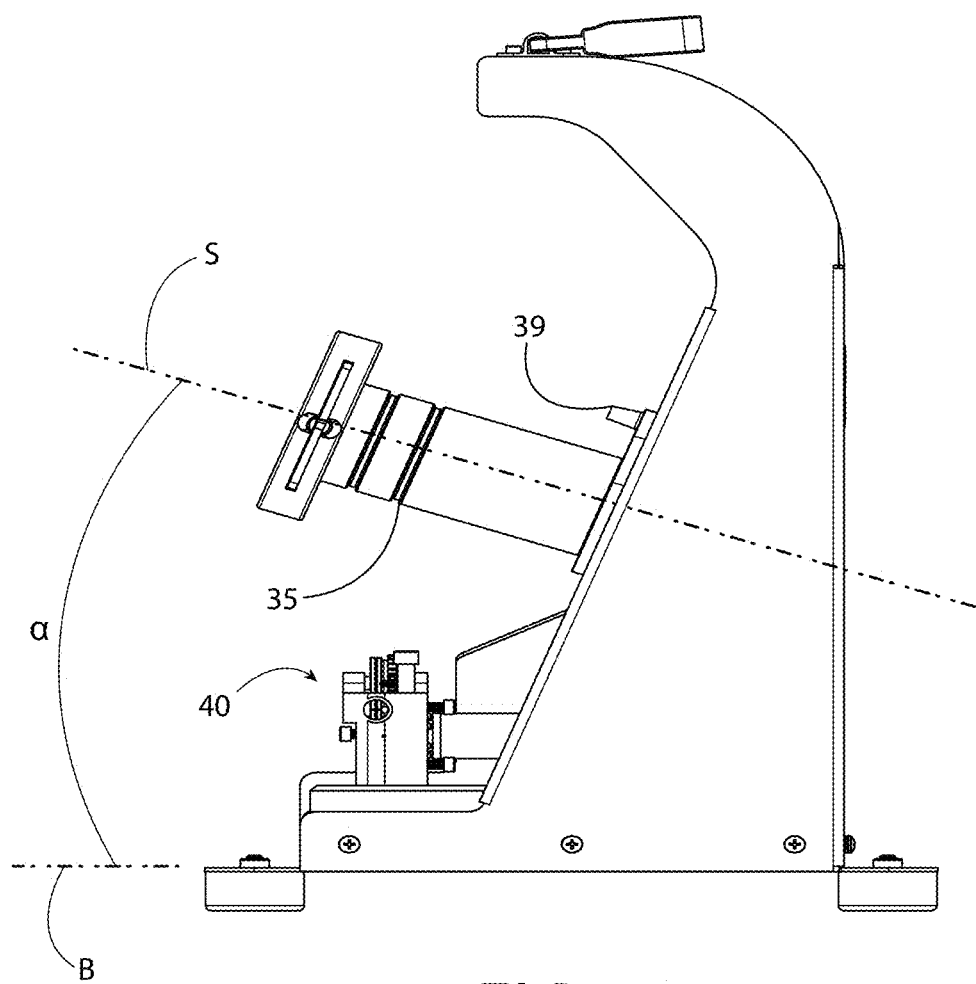
FIG. 10 is a right side elevational view of the wire spool support shown in FIG. 9.

The spindle 35 is generally a member that supports the spool 100 and allows it to rotate thereon to pay out wire W from the spool 100. The post 32 and spindle 35 may be formed integrally or by separate members that are attached to each other as shown. In accordance with one aspect of the invention and best seen in FIG. 10, the spindle 35 may be oriented at an angle α relative to a base Plane B. This may be accomplished in a variety of manners including but not limited to mounting the spindle 35 at an angle relative to the post 32 or mounting the spindle 35 perpendicular to post 32 and mounting the post 32 at an oblique angle relative to the base 15, as shown in FIG. 8. In the depicted example, the post 32 is mounted at an oblique angle Θ relative to the base 15 by cutting the end 31 of the post 32 on a bias and welding the biased end 31 of the post 32 to base 15 such that the extends from base 15 at an oblique angle G. Angle Θ may be any oblique angle i.e. greater than 90°. The larger the oblique angle Θ the greater the tilt angle α of spindle 35. In the example shown a tilt angle α of about 15-30° is achieved at spindle 35 by attaching post 32 at an angle of about 105-120°. Spindle 35 may be formed with post 32 or attached to the post 32. Spindle 35 may be attached to the post 32 by a fastener 36 including but not limited to a weld, an adhesive or mechanical fastener, such as the bolt shown.

Spindle 35 generally includes a cylindrical shaft 37 and an inner stop 38. Inner stop 38 may include any surface that holds the spool against axial inward movement and may include but is not limited to an integrally formed surface that extends radially from the spindle 35 such as the radial flange shown or a separate member that is attached to spindle 32, such as a pin, nut, or a clamp ring. As shown, stop 38 may include a boss 39 that projects axially outward from stop 38 to contact an inner edge 104 of spool 100. The boss 39 provides a smaller area of contact to reduce the friction between stop and spool 100.

By providing the spindle at an upward angle relative to the base plane B, the spindle 35 angles upward and outward. The tilt angle between the spindle 35 and base plane B and may be any angle greater than 0° and less than 90°. In the example shown, the angle between the spindle 32 and base plane B is about 30°. The upward angle of spindle 32 facilitates mounting of the spool 100 on spindle 35 by making it easier to align the spool with spindle 35. Also, once spool 100 is aligned with the spindle 35, gravity aids in sliding the spool 100 onto the spindle 35 allowing the user to withdraw their hands before the spool 100 reaches stop 38. It will be understood that title angle α of spindle 35 is optional and an angle of 0° may be used.

Figure 2:
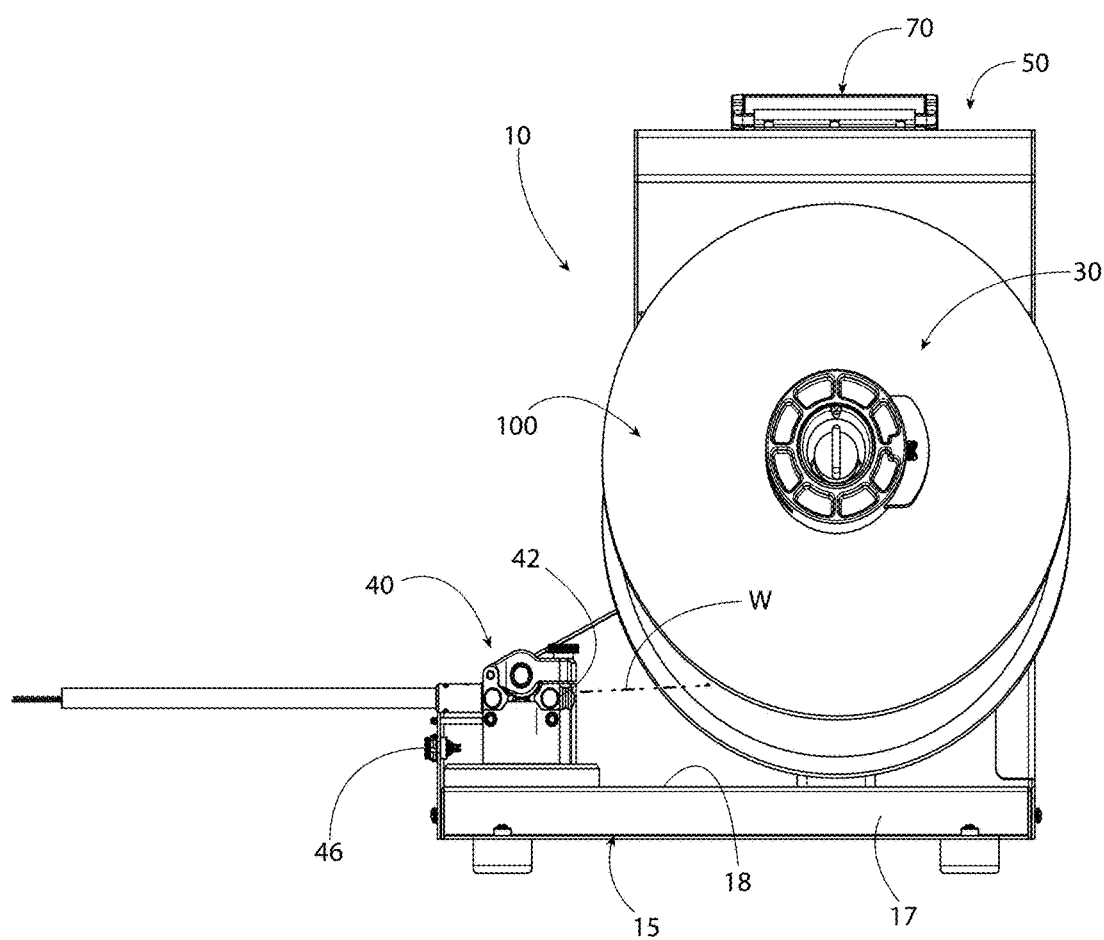
FIG. 2 is a front view thereof.
Figure 3:
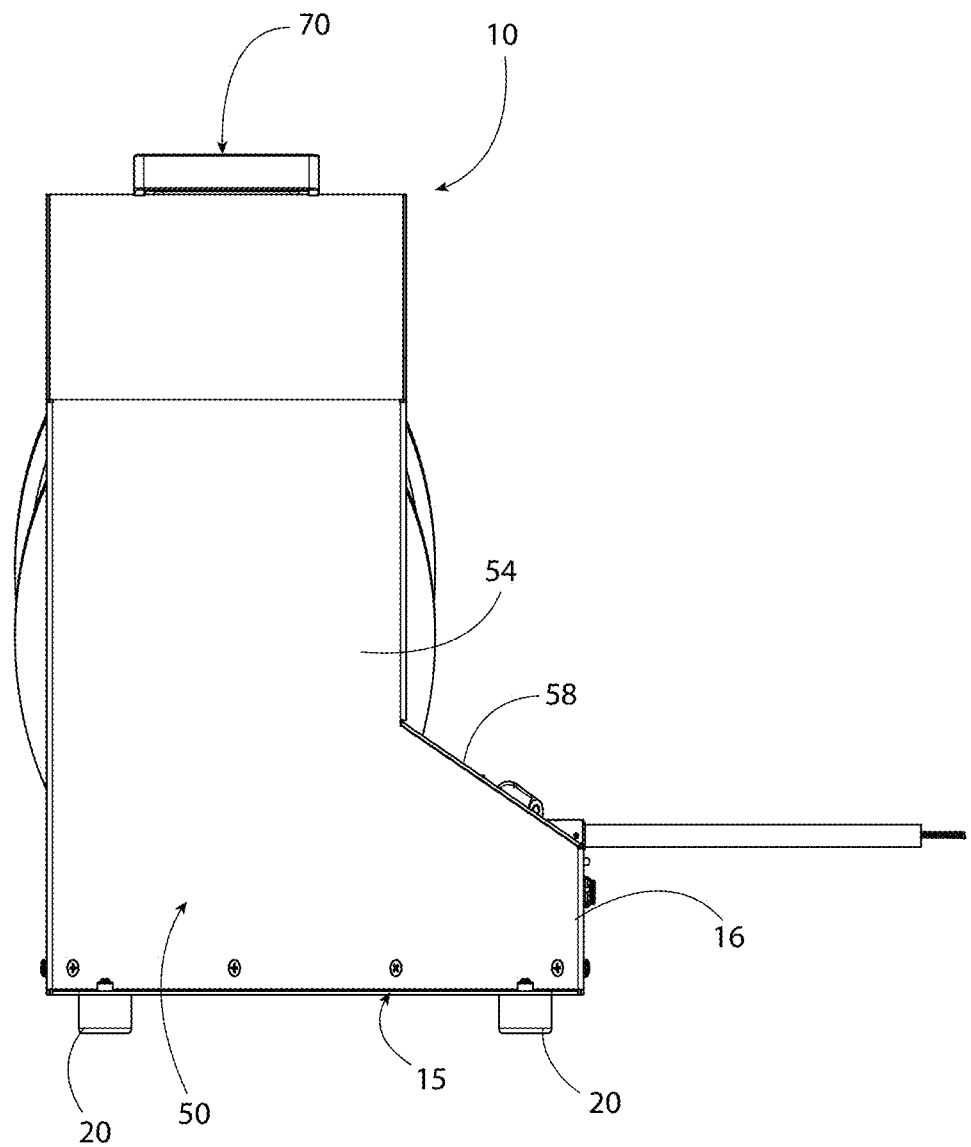
FIG. 3 is a rear view thereof.
Figure 9:
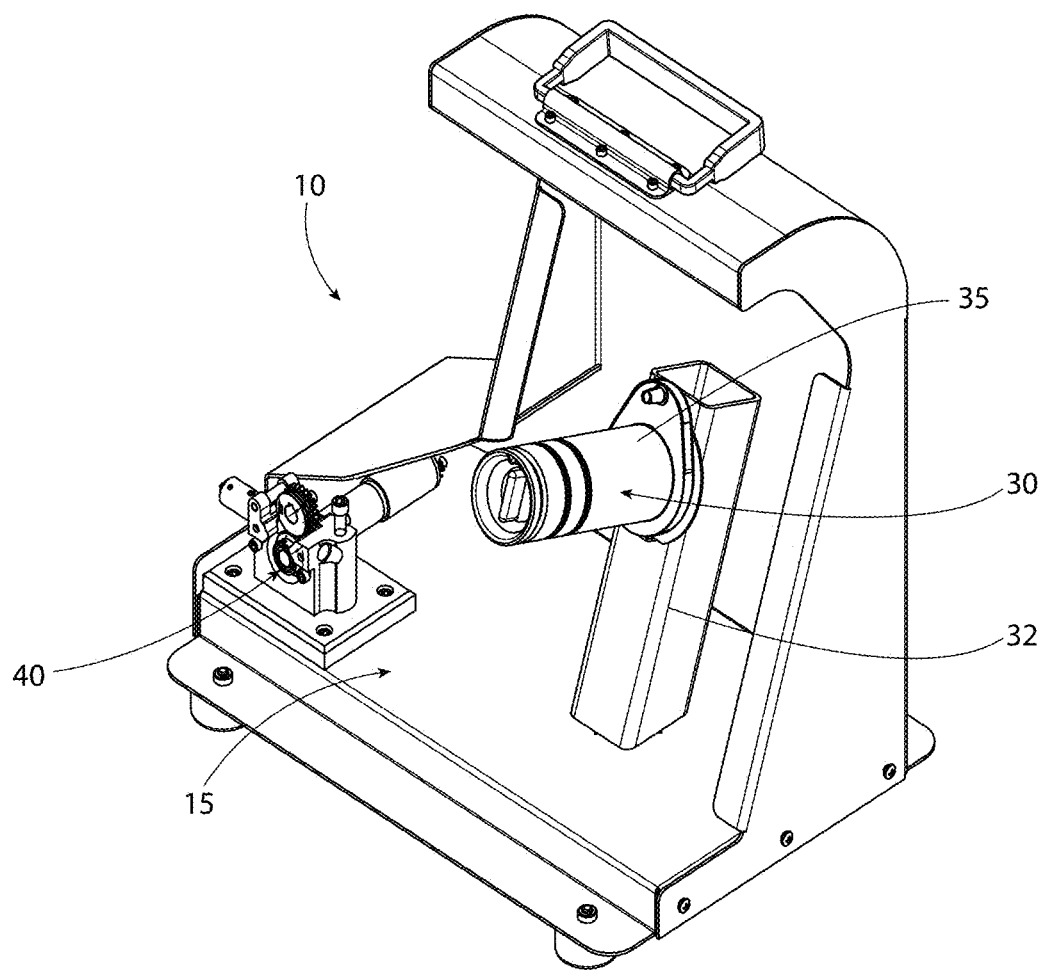
FIG. 9 is a perspective view similar to FIG. 1 with a welding wire spool removed.

A wire feeder 40 may be provided on base 15 as an option. It is contemplated by the invention that the subject welding wire spool support 10 may be used with an external wire feeder as well. In the example shown, wire feeder 40 is attached to a mounting plate 41 that is secured to the platform 17 toward the forward end 16 of base 15. As best shown in FIG. 2, wire feeder 40 includes a wire passage 42 in which wire W is received. The wire passage 42 defines an axis A (FIG. 4) that is aligned with the center of the spool 100 in the lateral sense and with the surface of the wire W when the wire on spool 100 is at one-half depth i.e. when half of the wire on the spool 100 has been paid out. As best shown in FIGS. 8 and 9, wire feeder motor 45 may extend inward from wire feeder 40. Power for the wire feeder 40 may be provided on board through the use of a battery or other energy storage device. In the embodiment shown, an external source power source is used. To that end, motor 45 may be wired to an interface 46 that provides power to wire feeder 40 and may include control connections for controlling operation of the wire feeder 40 from the welding power supply or other remote controller.

In accordance with another aspect of the invention, housing 50 generally includes an overhang 52 supported above spool 100 and extending outward to cover as least a portion of the spool 100. Overhang 52 may be supported by a frame or other support means. In the example shown, the overhang 52 is integral with housing 50 which also includes an upstanding sidewall 54 connected to base 15. The side wall 54 and overhang 52 form a generally L-shaped member that extends upward along one side of the stand and outward over a portion of stand 30. Overhang 52 may have any configuration including but not limited to a sloped configuration or a curved configuration as shown. In the example shown, the overhang 52 extends upward and outward from sidewall 54 to form a curved outer surface 56. This surface will allow debris or other materials that would ordinarily fall onto the spool 100 to catch on the overhang 52 and roll away from the spool toward the side wall 54. To provide a blunt outward facing surface, overhang 52 may include a nose 59 that extends downward from upper surface 56 at the outer end of overhang 52. In the example shown, nose 59 is formed by bending the end of the sheet forming the overhang 52 downward at a 90 degree angle. To further protect the user from sharp surfaces, nose 59 may be bent inward again so that a sharp edge is not located over spool 100 that might scrape or otherwise harm the user when the spool 100 is installed.

In accordance with another aspect of the invention, housing 50 may include a front face 55 and a rear face 57 that provide additional strength to side wall 54 by forming a gusset between side wall 54 and base 15. Front face 55 and rear face 57 may extend upward and outward to reinforce overhang 52 as well. The front and rear faces 55,57 may have any shape including rectangular or other regular polygon shapes. In the example shown, the front and rear faces 55,57 have a trapezoidal shape with a perpendicular rear edge that extends upward following the contour of side wall 54, and forward and downward sloped outer edge. Front face 55 and rear face 56 may be symmetrical or asymmetrical as shown. In the example shown, rear face 57 extends downward in a linear fashion to attach to the rear of base 15. An attachment portion 60B of rear face 57 overlaps the rear edge of the platform 17 to facilitate fastening of the housing 50 to base 15. The front face 55 terminates before reaching base 15 transitioning into a cover portion 58, described more completely below.

Housing 50 may include a cover portion 58 that extends forward of front face 55 over motor 45 of wire feeder 40. While cover portion 58 may have any configuration suitable to provide a clearance under which the motor 45 is received including but not limited to the linearly sloped surface shown. Cover 58 is sloped downward and forward relative to front face 55 extending toward the forward edge 16 of base 15. As shown, at the forward edge 16 of base 15, cover portion 58 may turn downward parallel to the front face 16 of base 15 and extend downward to overlap the base 15 at 60A for attachment thereto. In the example shown, cover 58 includes an attachment portion 60A that extends along the front edge of platform 17 to fasten housing 50 along the entirety of the front edge 16.

Front face 55 may terminate in a front outward edge 61 that lays generally perpendicular to the axis S of spindle 35 such that the front outward edge 61 of front face 55 is generally parallel to spool 100. It will be appreciated that other angles may be used without affecting the function of speed. For example angles greater than the angle shown would create additional clearance. Smaller angles could be used by moving the stop position outward.

Figure 5:
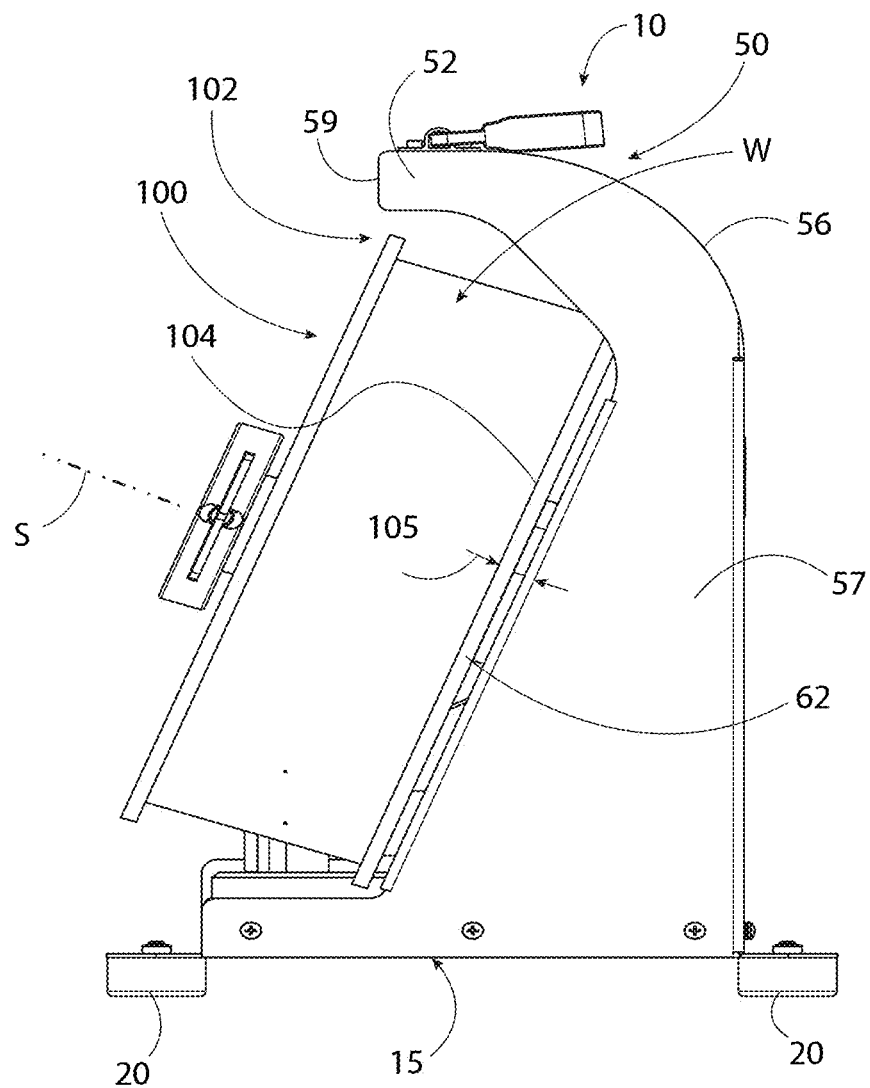
FIG. 5 is a right side view thereof.

As shown, front outward edge 61 extends downward and forward from overhang 52 toward cover portion 58. Rear face 57, likewise, may include a rear outer edge 62 that extends downward and outward from overhang 52 in the same manner. In the example shown, outer rear edge 62 terminates at the upper surface of platform 17, while the angle of front edge 61 and rear edge 62 are the same in depicted embodiment unequal angles may be used as well as curved or other contoured edges. In the example shown, outward edge of rear face 57 also extends generally perpendicular to the axis S of spindle 35 such that outward edge 62 is generally parallel to the spool 100. According to another aspect of the invention, edges 61 and 62 may be formed by folding a forward flange 63 and a rearward flange 64 inward from front face 55 and rear face 57 respectively. The flanges 63, 64 form a blunt surface facing the spool 100 and rounded edges at 61 and 62. Edges 61 and 62 may terminate inward of stop 36 on spindle 35 to create a clearance between edges 61 and 62 and inward edge 104 of spool 100. The clearance is generally indicated at 105 in FIG. 5. With continued reference to FIG. 5, overhang 52 may extend outward from side wall 54 sufficiently to overlap an outward edge 102 of spool 100 covering the entirety of the wire W wound on spool 100.

Figure 4:
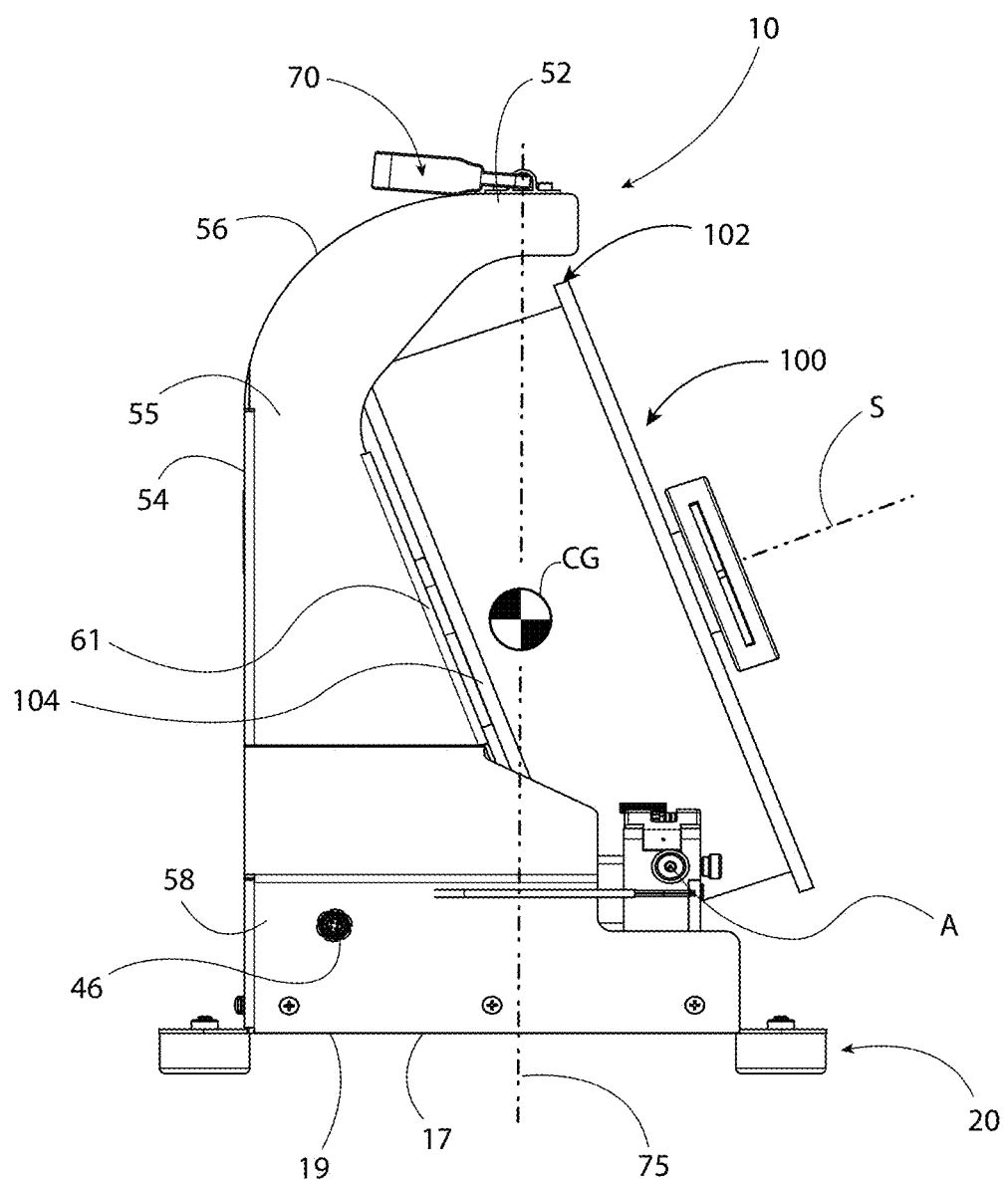
FIG. 4 is a left side view thereof.
Figure 6:
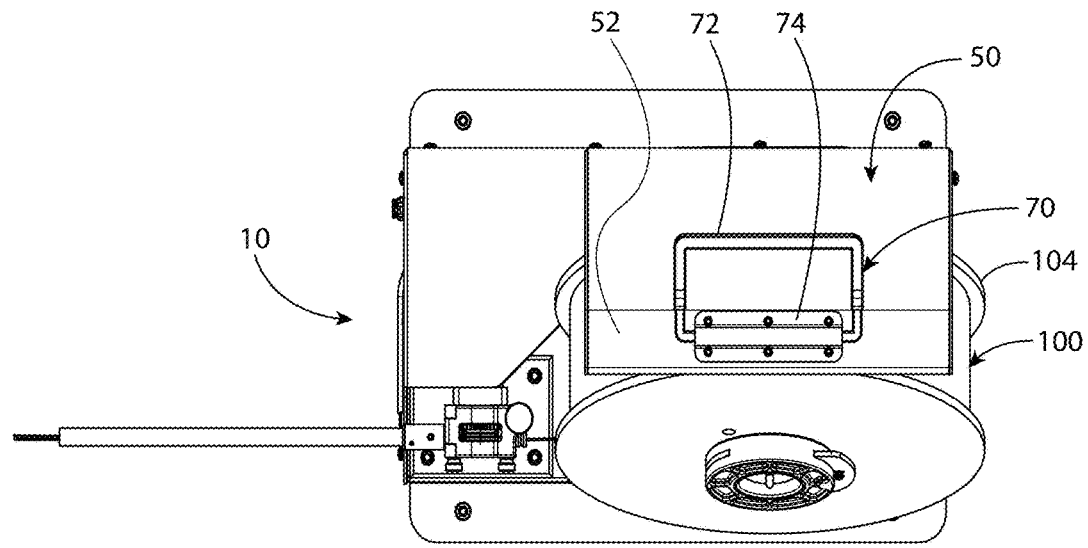
FIG. 6 is a top view thereof.
Figure 7:
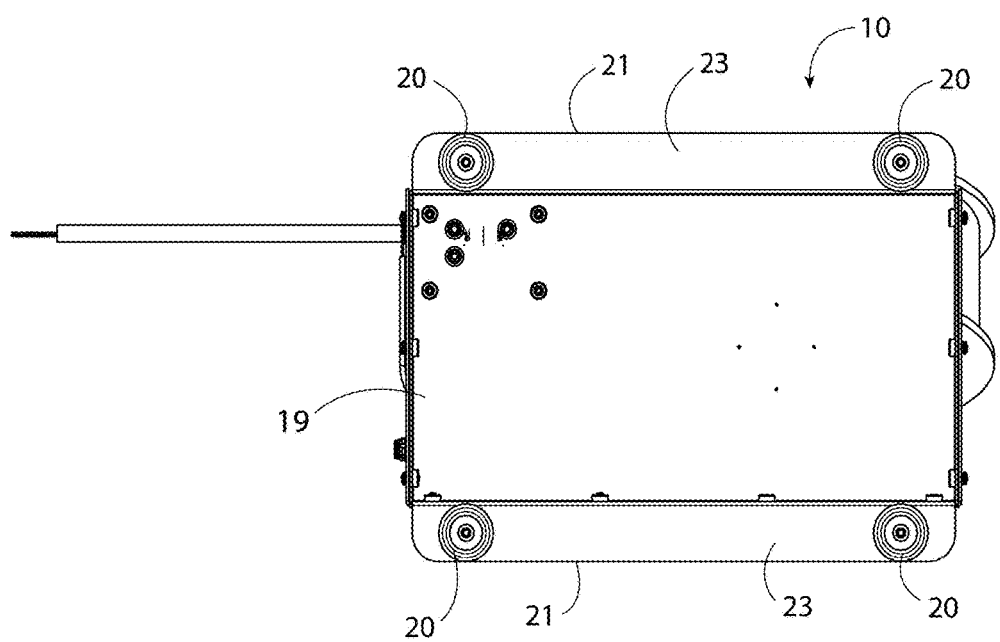
FIG. 7 is a bottom view thereof.

According to another aspect of the invention, housing 50 may be used to wire spool support 10 by providing a handle, generally indicated at 70, on a surface of housing 50. In the example shown in FIG. 6, handle 70 is attached to housing 50 at an outward edge of overhang 52. Handle 70 may be any gripable surface including but not limited to an opening in the housing, a depression, a projecting surface, or separately attached member. In the example, shown, a rectangular handle frame 72 is pivotally attached to the upper surface of overhang 52 by a bracket 74. It will be understood that handle 70 may be positioned anywhere on housing 50 to facilitate transport of the wire spool support 10. In the example shown, placement of the handle 70 near the outer edge of overhang 52 aligns the handle 70 with a vertical line 75 extending through the center of gravity CG of the welding wire support 10 with the spool 100 attached as best seen in FIG. 4. This position is believed to facilitate carrying of the wire spool support 10 by making it more balanced in the end of the user. It will be appreciated that other handle positions may provide a similar benefit and variation of the position beyond the center of gravity, although not ideal in terms of balance, it will not affect the function of the handle 70.

Housing 50 and other components described herein may be constructed of any suitable material including but not limited to plastics, metals, ceramics, pulp materials, wood, and combinations thereof. In the examples shown, base 15 and, post 32, housing 50 are constructed of a metal, such as steel. The housing 50 may be constructed of plural members attached to each other or as a single molded, bent, or otherwise shaped material. In the example shown, housing 50 is formed from sheet steel that is bent to form the depicted configuration. This configuration is not limiting as other shapes may be used without affecting the function of the housing.

While principles and modes of operation have been explained and illustrated with regard to particular embodiments, it must be understood that this may be practiced otherwise than as specifically explained and illustrated without departing from its spirit or scope.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A welding wire spool support comprises:
   a base;
   a post extending upward from the base, wherein the post is attached to the base in a manner that forms an oblique angle between the post and the base;
   a spindle extending outward from the post and adapted to rotatably support a spool thereon, wherein the spindle is attached to the post at a perpendicular angle to the post such that the spindle is positioned at an upward angle relative to the base; and a housing that is open on at least an outward side, wherein the housing includes an overhang supported above the spool and extending only partially over the spool when the spool is mounted on the spindle.

2. The welding wire spool support of claim 1, wherein the housing includes a sidewall extending downward from the overhang and attached to the base, a front face and a rear face extending outward from the side wall at a forward end of the base and a rear ward end of the base, where the front face and the rear face respectively terminate in a front edge and a rear edge spaced inward from the spool to define a clearance there between.

3. The welding wire spool support of claim 2, wherein the front edge and rear edge of the front face and rear face are formed by a front flange and a rear flange that are bent inward from the front face and rear face respectively, and wherein the front flange and rear flange extend parallel to an inward edge of the spool.

4. The welding wire spool support of claim 2, wherein the housing further includes a cover portion extending forward of the front face until it reached the forward edge of the base, where the cover portion turns downward at the front edge of the base and includes an attachment portion that overlies at least a portion of the front edge of the base and is attached thereto, and wherein the rear face has a rear attachment portion at its lower edge over lapping at least a portion of the rear edge of the base for attachment thereto.

5. The welding wire spool support of claim 4, further comprising a wire feeder supported on the base, the wire feeder being at least partially covered by the cover portion, and wherein the wire feeder defines a passage adapted to receive wire from the spool therein, the passage being aligned with a center of the spool in the lateral direction and aligned with a position corresponding to a surface of the wire on the spool when the spool is one half empty.

6. The welding wire spool support of claim 1, further comprising a handle mounted on the overhang.

7. The welding wire spool support of claim 6, wherein the handle is aligned with the center of gravity of the welding wire spool support with the spool attached to the spindle.

8. The welding wire spool support of claim 6, wherein the handle is pivotally mounted by a bracket supported on another edge of the overhang.

9. The welding wire spool support of claim 1, wherein the overhang has an outer surface that extends inward and downward toward an inward edge of the base and wherein the housing is open at an outward edge of the base and wherein the spindle extends outward from the post toward the outward edge of the base.

10. The welding wire spool support of claim 1, wherein the overhang extends outward of an outward edge of the spool when mounted on the spindle, the overhang including a blunt nose that extends downward from the overhang over the outward edge of the spool.

11. The welding wire spool support of claim 1, wherein the post has a proximal end mounted to the base and a freestanding distal end from which the spindle extends outward.

12. The welding wire spool support of claim 1, wherein the spindle further comprises an inner stop having a surface that holds the spool against axial inward movement, the upward angle of the spindle relative to the base configured to provide enhanced engagement between the inner stop and the spool.

13. The welding wire spool support of claim 12, wherein the inner stop further comprises a boss that projects axially outward from the inner stop, the boss providing a smaller area of contact to engage with the spool.

14. A welding wire spool support comprises:
a housing that is open on an outward side and partially on two lateral sides perpendicular to the outward side to form a spool receiving opening, the housing including an overhang extending above the spool receiving opening and extending only partially over an uppermost portion of the spool when the spool is mounted within the opening; and
a spindle adapted to rotatably support the spool, the spindle being supported within the opening by a post, wherein the spindle is positioned at a non-perpendicular angle relative to a base upon which the post is supported such that, when the spool is mounted on the spindle, the uppermost portion of the spool is positioned directly under the overhang and a lowermost portion of the spool is not positioned directly under the overhang.

15. The welding wire spool support of claim 14, wherein the spindle extends outward and upward from the housing toward the spool receiving opening.

16. The welding wire spool support of claim 14, wherein the housing is formed from a single sheet of material, the housing being attached to a base, wherein the base includes a spindle support extending upward therefrom, wherein the spindle is mounted on the post; and wherein a wire feeder assembly is supported on the base and adapted to draw wire from the spool.

17. The welding wire spool support of claim 14, wherein a handle is located on an upper surface of the overhang, the handle being aligned with a center of gravity of the housing and spindle when a full wire spool is supported on the spindle, and wherein the handle is pivotally attached to the upper surface of the overhang.

18. The welding wire spool support of claim 14, wherein the two lateral sides each extend at an angle perpendicular to the angle of the spindle such that both of the two lateral sides are positioned behind the wire spool when the wire spool is supported on the spindle, and wherein the angle at which the two lateral sides each extend is parallel to an angle of the post relative to the base.

19. A welding wire spool support comprising:
a housing, the housing being formed from a single sheet of material including a sidewall extending upward from a base, a front wall and a rear wall extending inward from the sidewall and defining an outward facing spool receiving opening;
the housing further including an overhang portion extending outward from an upper end of the sidewall, wherein the sidewall, front wall, rear wall, and overhang portion define a recess adapted to receive the wire spool therein;
a spindle supported within the recess above the base and extending outward toward the spool receiving opening to receive the wire spool thereon, wherein the spindle is supported by a post extending upward from the base at an oblique angle relative to the base;
wherein a surface of the front wall and a surface of the rear wall extend at an angle parallel to the oblique angle of the post such that both the front wall and the rear wall are behind the wire spool when the wire spool is supported on the spindle, and wherein the overhang portion extends outward from the sidewall above the spindle to only partially cover the wire spool when the wire spool is supported on the spindle.

* * * * *